(12) United States Patent
Peters et al.

(10) Patent No.: US 12,130,178 B2
(45) Date of Patent: Oct. 29, 2024

(54) EASILY ADJUSTABLE OPTICAL EMISSION SPECTROMETER

(71) Applicant: Hitachi High-Tech Analytical Science GmbH, Uedem (DE)

(72) Inventors: André Peters, Kleve (DE); Rainer Simons, Kranenburg (DE)

(73) Assignee: HITACHI HIGH-TECH ANALYTICAL SCIENCE GMBH, Uedem (DE)

( * ) Notice: Subject to any disclaimer, the term of this patent is extended or adjusted under 35 U.S.C. 154(b) by 231 days.

(21) Appl. No.: 17/774,405

(22) PCT Filed: Nov. 4, 2020

(86) PCT No.: PCT/EP2020/080992
§ 371 (c)(1),
(2) Date: May 4, 2022

(87) PCT Pub. No.: WO2021/089639
PCT Pub. Date: May 14, 2021

(65) Prior Publication Data
US 2022/0390279 A1 Dec. 8, 2022

(30) Foreign Application Priority Data
Nov. 5, 2019 (EP) .................................... 19207192

(51) Int. Cl.
*G01J 3/18* (2006.01)
*G01J 3/02* (2006.01)
*G01J 3/36* (2006.01)

(52) U.S. Cl.
CPC ........... *G01J 3/0286* (2013.01); *G01J 3/0291* (2013.01); *G01J 3/18* (2013.01); *G01J 3/36* (2013.01)

(58) Field of Classification Search
CPC ........ G01J 3/0291; G01J 3/0286; G01J 3/443; G01N 21/718
See application file for complete search history.

(56) References Cited

U.S. PATENT DOCUMENTS

| 4,209,696 | A | 6/1980 | Fite |
| 9,360,367 | B2 * | 6/2016 | Day .................... G01J 3/0208 |

(Continued)

FOREIGN PATENT DOCUMENTS

| CN | 203 838 063 U | 9/2014 |
| DE | 689 26 167 T2 | 8/1996 |

(Continued)

OTHER PUBLICATIONS

Khater: "Spectroscopic Investigations of Laser-Produced Steel Plasmas in the Vacuum Untraviolet"; A Thesis Submitted to the Faculty of Science for the Degree of Doctor of Philosophy (PhD), Dec. 1, 2001 (Dec. 1, 2001), May 11, 2020 (May 11, 2020), pp. 1-251, XP055693798, Ireland Retrieved from the Internet: URL:http://doras.dcu.ie/18938/1/Mohamed Abbas Khater 20130521131502.pdf—[retrieved-on May 11, 2020] p. 63-p. 73.

(Continued)

*Primary Examiner* — Maurice C Smith
(74) *Attorney, Agent, or Firm* — Tarolli, Sundheim, Covell & Tummino LLP (57) ABSTRACT

The invention relates to an optical emission spectrometer (1) being easily adjustable, and to a method (100) to set-up and operate such a spectrometer (1) comprising a plasma stand (2) to establish a light emitting plasma from sample material, and an optical system (3) to measure the spectrum of the light (L) emitted by the plasma being characteristic to the sample material, where the optical system (3) comprises at least one light entrance aperture (31), at least one diffraction grating (32) to split up the light (L) coming from the plasma (A) and one or more detectors (33) to measure the spectrum of the light (L), wherein the plasma stand (2) and the optical system (3) are directly and fixedly mounted on respective a plasma stand flange (2B) and an optical system flange (3B) which are directly and fixedly connected to each other and wherein the optical emission spectrometer (1) further comprises an analyzing unit (34) adapted to analyze the measured spectrum and to compensate for a drift of the spectrum relative to the detector (33) potentially caused by heat (Continued)

transferred from the plasma stand (2) to the optical system (3) considering the thermal expansion of the optical system (3).

14 Claims, 8 Drawing Sheets

(56) References Cited

U.S. PATENT DOCUMENTS

| | | |
|---|---|---|
| 2005/0052648 A1 | 3/2005 | Frick et al. |
| 2005/0127192 A1 | 6/2005 | Kang |
| 2009/0079980 A1 | 3/2009 | Goulter |
| 2012/0044488 A1* | 2/2012 | Senac .................... G01J 3/443 |
| | | 356/316 |

FOREIGN PATENT DOCUMENTS

| | | |
|---|---|---|
| EP | 2212903 A2 | 8/2010 |
| WO | 20070034569 A1 | 3/2007 |

OTHER PUBLICATIONS

International Search Report and Written Opinion issued in connection with PCT Patent Application No. PCT/EP2020/080992 dated Jan. 20, 2021.

* cited by examiner

EASILY ADJUSTABLE OPTICAL EMISSION SPECTROMETER

RELATED APPLICATIONS

The present invention is a U.S. National Stage under 35 USC 371 patent application, claiming priority to Serial No. PCT/EP2020/080992, filed on Nov. 4, 2020; which claims priority from European Patent Application No. 19207192.6 filed Nov. 5, 2019; the entireties of both are hereby incorporated herein by reference.

SUBJECT OF THE INVENTION

The invention relates to an optical emission spectrometer being easily adjustable, and to a method to set-up and operate such a spectrometer.

BACKGROUND OF THE INVENTION

An arc/spark or LIBS Optical Emission Spectrometer (OES) is a device for chemical analysis and is used to display and measure the emission spectrum of chemical substances. With LIBS, sample material is evaporated and excited by a laser. With arc/spark, the energy for evaporation and excitation is provided by an electric arc or a series of sparks between an electrode and a material sample operating as counter-electrode. In either case a plasma is generated from (a fraction of) the sample material. The light being emitted by the plasma is transmitted to the optical system(s) of the OES where it is broken down into its individual spectral components. Each chemical element contained in the sample emits at several characteristic wavelengths (spectral lines) and can therefore be identified. The light intensity of spectral lines thus measured corresponds to the concentrations of the associated elements in the sample.

Due to several reasons, especially to protect the plasma from ambient air, the excitation usually takes place in a so-called spark stand or plasma stand which is Argon purged. The light path from the plasma into the optical system might comprise an optical fiber. However, wavelengths shorter than 185 nm will be absorbed by optical fibers and ambient air, so an Argon purged light path without optical fiber is needed. Such a light path comprises only optical windows, lenses, mirrors and the like, if at all, and is called "direct view". To ensure proper direct view of the plasma, optical system and plasma stand need to be aligned exactly with respect to each other.

However, the energy applied to the sample produces a certain amount of heat in the plasma stand. If the heat is transferred from the plasma stand to the optical system, a non-desired thermal expansion thereof may cause a loss of resolution and performance. Therefore, it is state of the art to implement some thermal insulation between the optical system and the plasma stand, e.g. providing some kind of gap or arranging thermally insulating material like Nylon in between. The thermal insulation between plasma stand and optical system may also provide electrical insulation between plasma stand and optical system to prevent electrical flashovers to the optical system.

The mechanical connection will not be a rigid one; instead, plasma stand and optical system are designed (more or less) as separate units being individually adjustable to obtain a proper alignment to each other. This kind of design results in a complex and critical adjustment process of both units. The adjustment of the units must be carried out carefully in order to achieve good optical resolution of the OES. The use of a vacuum or gas filled optics chamber for the observation of vacuum ultraviolet (VUV) wavelengths also makes access to the optical system and the plasma stand more difficult, making adjustment even more complicated.

The following alignment procedures are to be applied for an optical emission spectrometer (OES) according to the state of the art: (a) alignment of the position and orientation of the plasma stand as a freely adjustable plasma stand with reference to the instrument housing, for example with a plasma stand plate perpendicular to the housing front, (b) alignment of the optical or vacuum chamber inside an instrument housing providing a gas-tight mechanical connection between optical system and plasma stand, (c) alignment of the optical system inside the optical/vacuum chamber with respect to the plasma stand using jigs or laser pointers or images of the plasma at some positions along the beam path, and (d) alignment of a switchable or variable mask inside the plasma stand to shield some (hot) parts of the plasma against the optical system in order to be able to only observe the atomic spectral lines in the colder part of the plasma without contribution of ionized lines coming from the hot part of the plasma. Adjustment steps (a)-(c) are commonly done visually so the accuracy of each step is around ±0.1 mm at best. The masking of step (d) is commonly adjusted using a spectral line signal, e.g. the intensity of Fe 187.6 nm. Assuming that the plasma is fully visible without mask, the mask is adjusted to provide an intensity of 25% of the initial intensity of the spectral line. This procedure results in a masking of the hot section of the plasma. Some plasma stands employ permanent masking where the proper alignment between plasma stand and optical system becomes particularly critical. In other systems the mask might be switchable or adjustable, e.g. by stepper motors, to optimize masking depending on the base material (matrix) of the sample. Proper masking and alignment of the optical system with respect to the plasma stand shall ensure a good repeatability of the measurements as well as good limits of detection if the spectral line in question is sensitive to masking.

It would therefore be desirable to have an optical emission spectrometer available that has minimal adjustment effort and yet provides very good resolution.

SUMMARY OF THE INVENTION

It is an object of the invention to provide an optical emission spectrometer having a minimal adjustment effort and also providing very good optical resolution.

The object is solved by an optical emission spectrometer comprising a plasma stand to generate a light emitting plasma from sample material and an optical system to measure a spectrum of the light emitted by the plasma being characteristic to the sample material, where the optical system comprises at least one light entrance aperture, at least one diffraction grating to split up the light coming from the plasma into a spectrum, and a detector setup consisting either of a combination of exit apertures and PMT detectors or of spatially resolving solid state detectors such as CCD or CMOS line or area sensors to measure the spectrum, wherein the plasma stand and the optical system are directly and fixedly mounted on respective a plasma stand flange and an optical system flange which are directly and fixedly connected to each other and wherein the optical emission spectrometer further comprises an analyzing unit adapted to analyze the measured spectrum and to compensate for a drift of the spectrum relative to the detector caused by heat transferred from the plasma stand to the optical system considering the thermal expansion of the optical system.

The plasma can be provided by an electrical discharge ignited between two opposite electrodes, where one of the electrodes is the sample material to be analyzed. Spark or arc atomic emission spectroscopy is used for the analysis of metallic elements in solid samples. An electric arc or spark is passed through the sample, heating it to a high temperature to evaporate and excite the atoms within it. The excited sample atoms emit light at characteristic wavelengths that can be dispersed with the diffraction grating and quantitatively detected. Quantitative spark analysis can be used for production quality control in foundry and metal casting facilities.

Alternatively, the plasma can be provided by laser-induced breakdown spectroscopy (LIBS), which is a type of atomic emission spectroscopy which uses high energy laser pulses as excitation source. The laser is focused to form the plasma by atomizing and exciting the sample material. The formation of the plasma only begins when the focused laser achieves a certain threshold for optical breakdown, which generally depends on the environment and the target material. LIBS makes use of optical emission spectrometry and is to this extent very similar to arc/spark emission spectrometry.

The emission lines to be measured may vary from the infrared spectrum to the ultraviolet spectrum. The ambient air has a cut-off wavelength of 185 nm absorbing shorter wavelengths. If shorter wavelengths shall be detected the optical emission spectrometer has to be operated free of ambient air, e.g. in Argon atmosphere, in order to avoid non-desired absorption along the light path from the plasma stand to the detector in the optical system.

The performance of common spectrometers, especially the spectral resolution, depends on the set-up and adjustment of the optical spectrometer, the applied optical components, their arrangement and the material used for these components and for the base plates. The present invention avoids any decrease of performance due to non-optimum adjustments, because the direct and fixed connection of optical system and plasma stand provides a defined and constant adjustment of both components relative to each other excluding any manual misalignment.

The direct and fixed connection between plasma stand and optical system leads to a heat transfer from the plasma stand to the optical system leading to a temperature increase and a resulting thermal expansion of the optical system. The thermal expansion results in a thermal drift of the emission lines relative to the detector. Since the warming up of the optical system is a relatively slow process, occurring drift of emission lines can be continuously compensated by an analyzing software installed and executed on the analyzing unit comprising a processor to execute the software and a data storage to store the measured data. The drift compensation by the analyzing unit and the plasma stand directly and fixedly connected to the optical system avoid alignment errors and alignment drifts during use, both leading to a good spectral resolution and robust performance over time. Furthermore, avoiding the critical and time-consuming alignment procedures enables a faster and easier use of the optical emission spectrometer according to the present invention with even better spectral resolution compared to devices according to state of the art with complicated and failure sensitive alignment procedures.

Therefore, the optical emission spectrometer according to the present invention provides an optical emission spectrometer having a minimal adjustment effort and also providing a very good resolution.

In another embodiment the plasma stand flange and the optical system flange comprise a non-adjustable mounting means to connect both flanges together. These mounting means assure an easy and simple (self-) alignment of the plasma stand flange and the optical system flange towards each other. Further, the position and the distance of flanges towards each other is secured by the mounting means. Mounting means used in this embodiment can be screws, pins, and the like, also a click connection is possible.

In another preferred embodiment at least the optical system flange and the optical components within the light path between entrance slit and detector are made of the same material. This creates a uniform temperature distribution, and unnecessary and material-wearing temperature fluctuations can be prevented.

The material may be metal, preferably a light metal.

In another embodiment the plasma stand flange is made of an electrically insulating material. The insulating material prevents that an electrical current induced by the generation of the plasma is going through the plasma stand and plasma stand flange, thus protecting the plasma stand and all components connected to it. It is preferred to use sandwich materials like Trespa or Resopal, or thermally stable plastics like a polyamide (Nylon) or a polyetheretherketone (PEEK), or a ceramic material as an electrically insulating material.

In another preferred embodiment the connection between plasma stand flange and optical system flange is executed as a rigid toothed connection (e.g. a hirth joint) to prevent de-alignment between both flanges. The toothed connection ensures that the connection points mesh with each other, so that on the one hand the desired easy and simple alignment is accomplished and on the other hand the de-alignment is prevented. Therefore, a Hirth joint is preferably used, which can be used to connect two elements and is characterized by tapered teeth that mesh together on the end faces of each element.

Rigid toothed connections are particularly beneficial when it might become necessary to dismantle the plasma stand from the optical system during maintenance procedures. A self-adjusting setup will ensure conservation of the accurate direct view of the plasma.

In another embodiment the plasma stand comprises an optical mask fixedly connected to the optical system or to the plasma stand and suitably arranged within the light path between plasma stand and optical system to mask at least a hot part of the plasma.

In another preferred embodiment the plasma stand is a spark stand with a spark chamber containing an (e.g. positively charged) electrode. The sample material closes the spark chamber and is acting as a counter electrode. The axis of the spark is defined as the connecting line between sample surface and the (e.g. positively charged) electrode tip.

There is a large temperature gradient along the axis of the spark within the plasma. The entrance aperture(s) of an optical system connected in direct view to the plasma stand may be oriented parallel to the axis of the spark or perpendicular to it. Perpendicular orientation decreases the width of the spectrometer system and allows for the optical mask to be placed anywhere in the beam path between spark chamber and entrance aperture since the entrance aperture acts as a pinhole camera with respect to the beams coming from the direction along the axis of the spark. The hot part of the plasma is located close to the sample surface. Parallel orientation decreases the height of the spectrometer system and forces the optical mask to be close to the plasma to achieve sharp masking of at least the hot area of the plasma.

In another embodiment the plasma stand is a Laser-induced breakdown spectroscopy (LIBS) stand, where a laser is focused on the sample material as a target material to generate the plasma.

To increase the flexibility of measurements regarding places and time and to ensure easy handling of the optical emission spectrometer, it is preferred that the optical emission spectrometer is a mobile device.

Furthermore, the object is solved by a method to set up and operate an optical emission spectrometer as described above. Therefore, the optical emission spectrometer comprises a plasma stand directly and fixedly mounted on a plasma stand flange and an optical system directly and fixedly mounted on an optical system flange comprising several optical components. The method for operating these optical emission spectrometers is comprising the steps of directly and fixedly connecting the plasma stand flange and the optical system flange to each other;
establishing a light emitting plasma from sample material;
generating a spectrum of the light emitted by the plasma being characteristic to the sample material using an optical system comprising at least one entrance aperture and at least one diffraction grating;
measuring the spectrum by one or more detectors; and
analyzing the measured spectrum and compensating it for a drift of the spectrum relative to the detector potentially caused by heat transferred from the plasma stand to the optical system considering the thermal expansion of the optical system by an analyzing unit.

In another embodiment the method can further comprise the step of masking at least a hot part of the plasma by an optical mask suitable arranged within the light path between plasma stand and optical system and fixedly connected to the optical system or to the plasma stand depending on the orientation of the optical system to the axis of the spark.

The above listed embodiments can be used individually or in any combination to provide the device and process according to the invention.

BRIEF DESCRIPTION OF THE DRAWINGS

These and other aspects of the invention are shown in detail in the illustrations as follows.

DETAILED DESCRIPTION OF EMBODIMENTS

Figure 1:
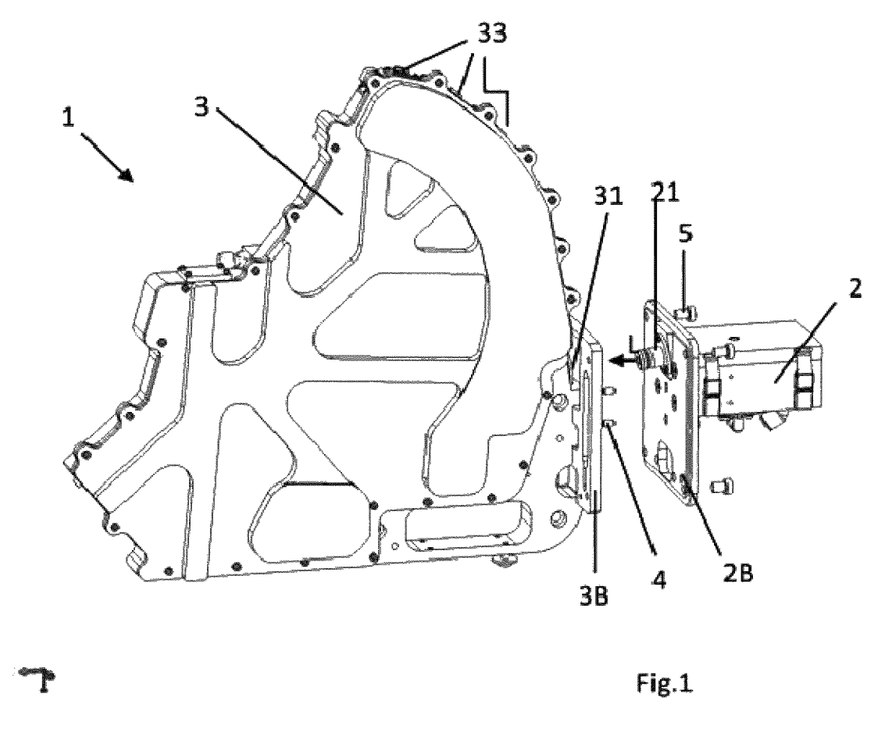
FIG. 1: schematic view of an embodiment of the optical emission spectrometer according to the present invention with the plasma stand and the optical system aligned but in an unmounted condition.
Figure 2:
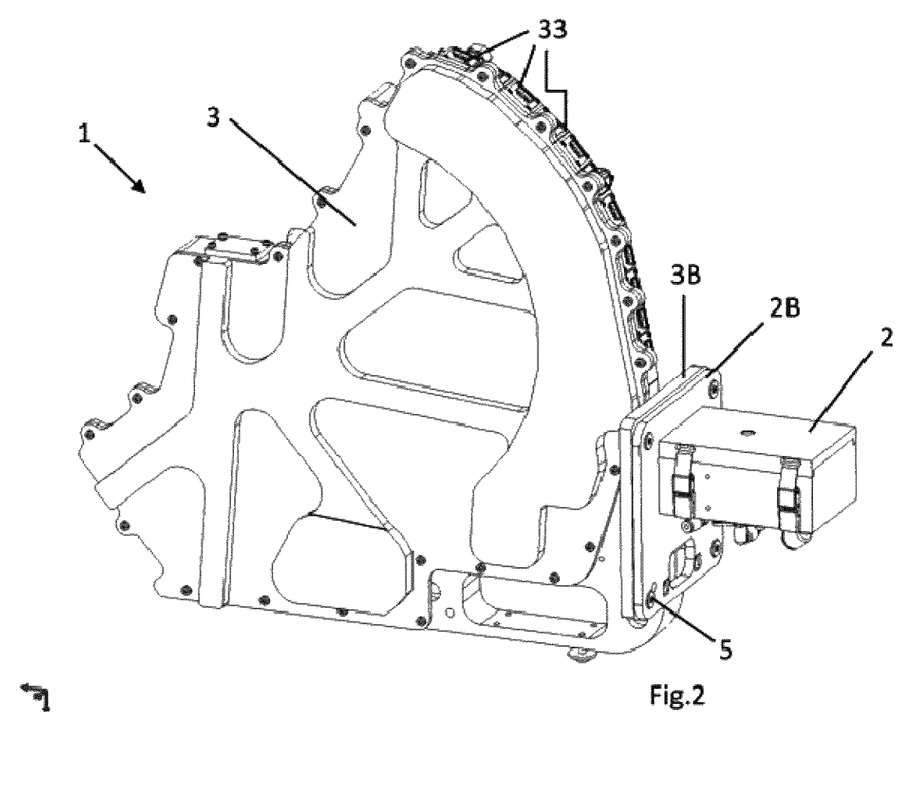
FIG. 2: schematic view of an embodiment of the optical emission spectrometer according to the present invention with the plasma stand and the optical system aligned and mounted to each other.

FIG. 1 and FIG. 2 show the optical emission spectrometer 1 comprising a plasma stand 2 to establish a light emitting plasma from sample material, and an optical system 3 to measure the spectrum of the light L emitted by the plasma being characteristic to the sample material. The optical system 3 comprises at least one light entrance aperture 31, at least one diffraction grating to diffract the light L coming from the plasma A into a spectrum, and one or more detectors 33 to measure the spectrum of the light L. These components of the optical system 3 and the associated optical system flange 3B are made from the same material, which in order to withstand the temperatures is a metal. The plasma stand 2 and the plasma stand flange 2B are also made from the same material which is also metal. On the other hand, the plasma stand flange 2B can be made from Trespa to electrically insulate the plasma stand 2. However, it is not excluded that the plasma stand flange 2B is made of suitable plastic, ceramics or Resopal or a combination thereof. The optical emission spectrometer 1 further comprises an analyzing unit 34 adapted to analyze the measured spectrum and to compensate for a drift of the spectrum relative to the detector 33 potentially caused by heat transferred from the plasma stand 2 to the optical system 3 considering the thermal expansion of the optical system 3.

In order to be mounted together, the plasma stand 2 with its plasma stand flange 2B is aligned towards the optical system flange 3B of the optical system 3. The plasma stand 2 as shown in FIG. 1 comprises a connecting nozzle 21, which is fixedly connected to the plasma stand flange 2B of the plasma stand 2. For better and easier alignment of the plasma stand flange 2B to the optical system flange 3B the optical system flange 3B provides guiding devices 4. In the embodiment shown in FIG. 1 these guiding devices 4 are pins. However, it is possible that these guiding devices 4 are guiding rails or similar devices. As a further guiding support for the alignment of the plasma stand 2 and the optical system 3 the entrance aperture 31 and the connecting nozzle 21 have complementary geometries, such that the connecting nozzle 21 can be inserted into the entrance aperture 31.

In a mounted state of the plasma stand 2 to the optical system 3, as shown in FIG. 2, the plasma stand 2 and the optical system 3 are directly and fixedly mounted on respectively a plasma stand flange 2B and an optical system flange 3B which are directly and fixedly connected to each other. Thereby the mounting of the plasma stand flange 2B to the optical system flange 3B is done with non-adjustable mounting means 5, which in that example are a combination of screws and pins 5. Instead of screws, it is possible to use a click connection.

To measure the individual spectral components in the optical emission spectrometer 1, it is necessary to transmit the light being emitted by the plasma generated in the plasma stand 2. The here described optical emission spectrometer 1 assumes two possibilities for the plasma generation from (a fraction of) the sample material. The plasma stand 2 can either be an arc/spark stand 2, see FIG. 3a) and FIG. 3c), or a Laser-induced breakdown spectroscopy LIBS stand 2, see FIG. 3a).

Figure 3A:
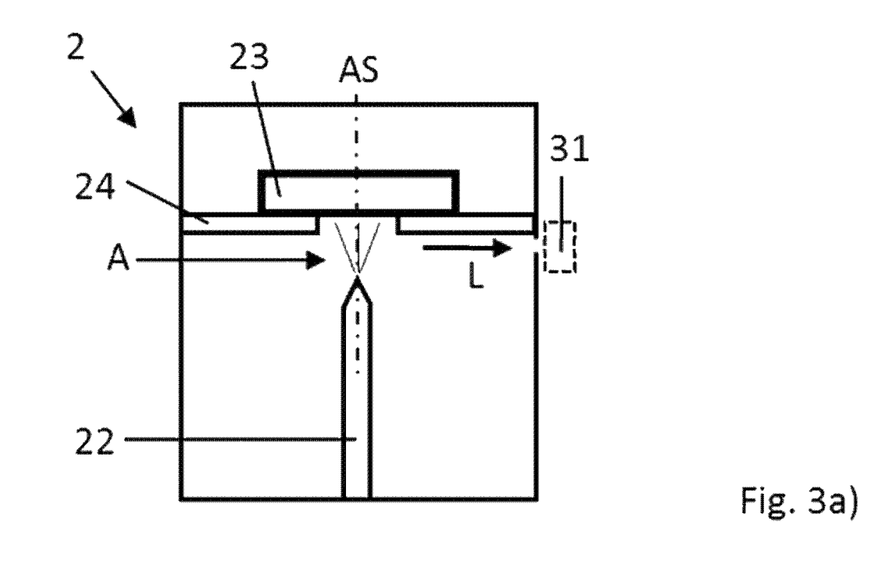
FIG. 3: a schematic view of the plasma stand according to the present invention as an arc/spark stand (a), as a LIBS stand (b) with mirror elements and (c) without mirror elements and as (d) sliding spark spectrometer.

FIG. 3a) shows the plasma stand 2 as an arc/spark stand 2, where a discharge A between two electrodes 22, 23 is established to generate the arc/spark plasma of the sample material. The counter electrode is made from sample material 23. The axis of the arc/spark AS is arranged essentially perpendicular to the entrance aperture 31. Here, the "entrance aperture" with respect to the direction of this aperture means the axis of the aperture. However, it is also possible to arrange the axis of arc/spark AS parallel to the entrance aperture 31 in the embodiment of FIG. 3a). The established arc/spark A evaporates the sample material electrode 23 generating the plasma that emits the Light L for the spectral analysis in the optical system 3.

Figure 3B:
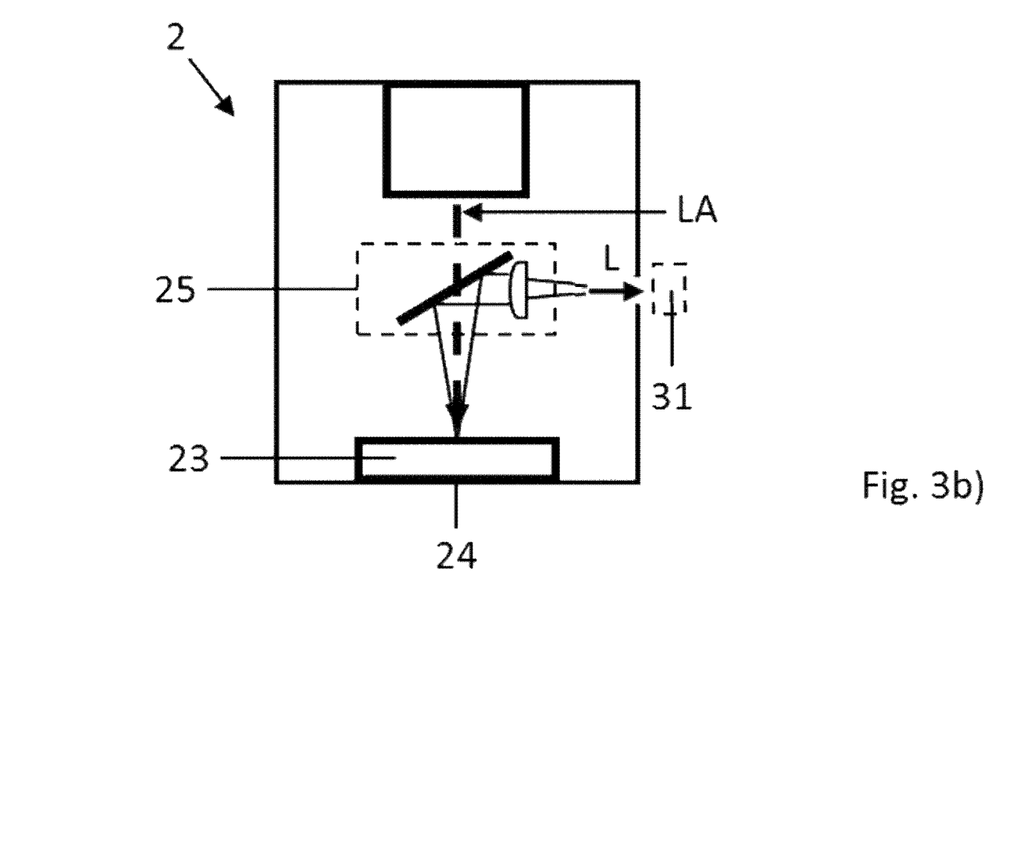
Figure 3C:
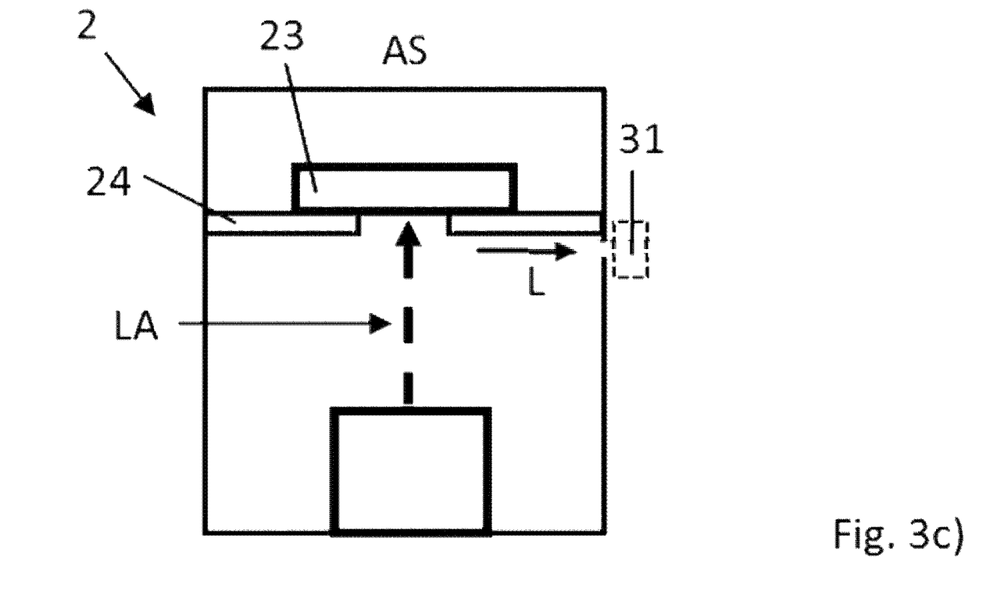

FIG. 3b) and FIG. 3c) each show a plasma stand 2 as used in Laser-induced breakdown spectroscopy (LIBS). In LIBS sample material 23 is evaporated and excited by a laser LA. The sample material 23 is arranged on the sample stand 24 underneath the laser LA, such that the laser LA is focused on the sample material 23 as a target material to generate the plasma. In the embodiment of FIG. 3b) the generated plasma respectively the light L emitted by the plasma is then reflected and focused by the optical device 25, especially a mirror element and a focusing lens, in the plasma stand 2 to transmit the light L to the entrance aperture 31 of the optical system 3. This allows a focusing of light L and an increase in accuracy. In the embodiment of FIG. 3c) the generated plasma respectively the light L emitted by the plasma is transmitted directly to the entrance aperture 31. This embodiment is more simple and allows spatial masking of the plasma and a reduction in size.

Figure 3D:
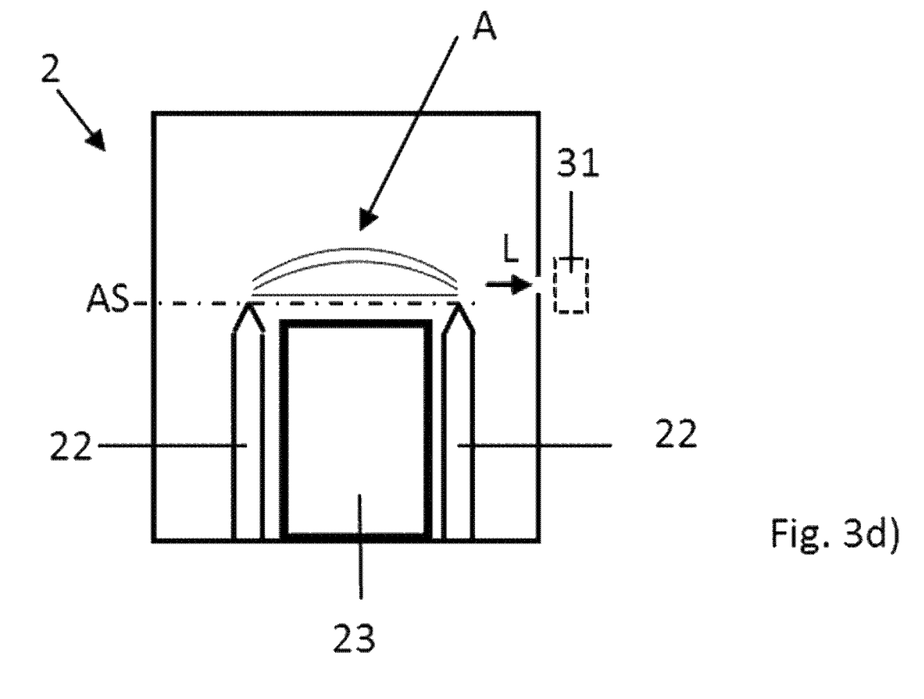

FIG. 3d) shows a sliding spark spectrometer in schematic visualization. An arc A is ignited between two electrodes 22 and slides along a non-conductive sample 23 arranged between the electrodes 22, thereby vaporizing the sample material and transforming it into plasma state. The sliding spark plasma emits the characteristic spectral lines of the sample material. A direct light optics may be mounted self-aligning to the spark stand.

Figure 4:
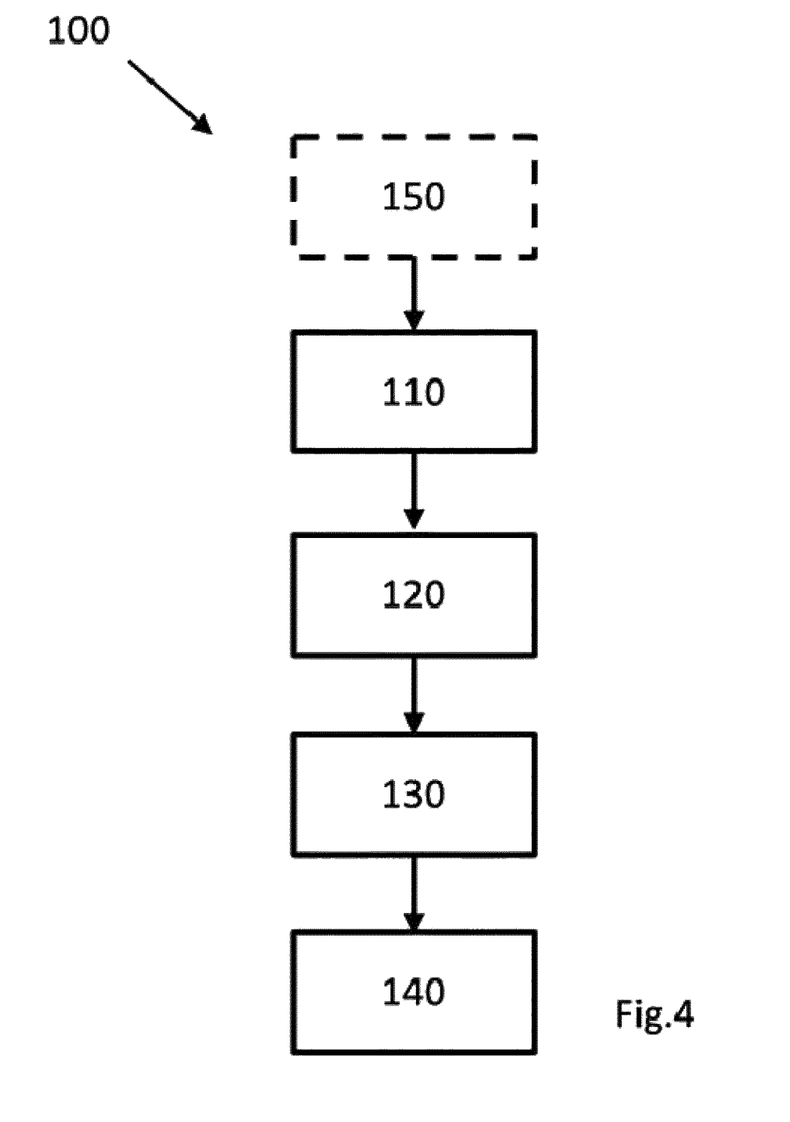
FIG. 4: a flowchart of the method according to the present invention.

The FIG. 4 shows the method 100 to set up and operate the optical emission spectrometer 1 as described above. For this, the plasma stand 2 that is directly and fixedly mounted on a plasma stand flange 2B and the optical system 3, comprising several optical devices 32, 33, that is directly and fixedly mounted on a optical system flange 3B are initially supplied as individual parts, as shown in FIG. 2. After connecting the plasma stand 2 to the optical system flange 3B, the optical mask is suitably arranged within the light path of the plasma stand 2 and optical system 3 and fixedly connected to e.g. the plasma stand 2 if entrance aperture and axis of the spark are oriented parallel to each other to mask at least a hot part of the plasma. In a second step 120 the light L emitting plasma from the sample material 23 is established, such that the spectrum of the light L emitted by the plasma being characteristic to the sample material using an optical system comprising at least one entrance aperture 31 and at least one diffraction grating 32 is generated. Subsequently, the spectrum of the light L is measured by one or more of the detectors 33 of the optical system 3 in a third step 130. After the measurement the forth step 140 is carried out, in which the measured spectrum of the light L is analyzed and the drift of the spectrum of the light L relative to the detector 33 potentially caused by heat transferred from the plasma stand 2 to the optical system 3 is compensated by an analyzing unit. In another embodiment the method can further comprise the step 150 of masking at least a hot part of the plasma by an optical mask suitable arranged within the light path between plasma stand 2 and optical system 3 and fixedly connected to the optical system 3 or to the plasma stand 2 depending on the orientation of the optical system 3 to the axis of the spark AS.

Figure 5:
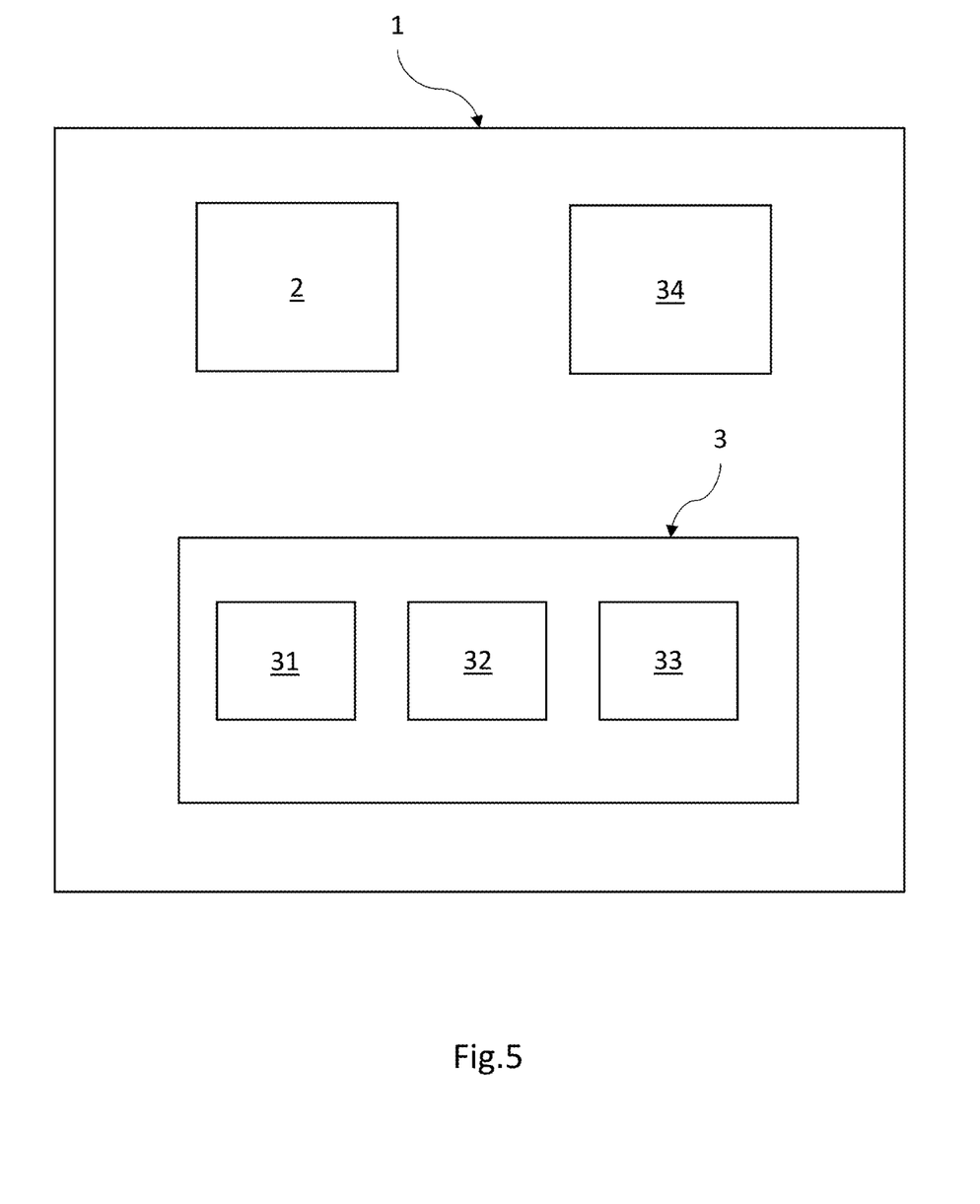
FIG. 5: schematic view of an embodiment of the optical emission spectrometer having a plasma stand, an optical system, and an analyzing unit according to the present invention.

FIG. 5 illustrates the optical emission spectrometer 1 comprising the plasma stand 2 to establish a light emitting plasma from sample material, the optical system 3 to measure the spectrum of the light emitted by the plasma being characteristic to the sample material, and the analyzing unit 34 adapted to analyze the measured spectrum and to compensate for a drift of the spectrum. The optical system 3 comprises the at least one light entrance aperture 31, the at least one diffraction grating 32 to split up the light coming from the plasma and the one or more detectors 33.

LIST OF REFERENCE NUMERALS 1 optical emission spectrometer according to the present invention
2 plasma stand
2B plasma stand flange
21 connecting nozzle
22 electrode of the plasma stand
23 sample material
24 sample stand
3 optical system
3B optical system flange
31 entrance aperture, e.g. an entrance slit
32 diffraction grating
33 detector setup
34 control unit
4 guiding devices
5 mounting means
100 method to set up and operate an optical emission spectrometer according to the present invention
110 directly and fixedly connecting the plasma stand flange and the optical system flange to each other
120 establishing (120) a light emitting plasma from sample material
130 measuring the light spectrum of the light emitted by the plasma
140 analyzing the measured spectrum and compensating for a drift of the spectrum relative to the detector
150 masking at least a hot part of the plasma by an optical mask
A arc
AS axis of arc/spark
LA Laser
L Light

The invention claimed is:

1. An optical emission spectrometer comprising:
a plasma stand to establish a light emitting plasma from sample material;
an optical system to measure the spectrum of the light emitted by the plasma being characteristic to the sample material, where the optical system comprises at least one light entrance aperture, at least one diffraction grating to diffract the light coming from the plasma into a spectrum, and one or more detectors to measure the spectrum of the light, wherein the plasma stand and the optical system are directly and fixedly mounted on respectively a plasma stand flange and an optical system flange which are directly and fixedly connected to each other; and
an analyzing unit adapted to analyze the measured spectrum and to compensate for a drift of the spectrum relative to the detector potentially caused by heat transferred from the plasma stand to the optical system considering the thermal expansion of the optical system.

2. The optical emission spectrometer according to claim 1, wherein the plasma stand flange and the optical system flange comprise non-adjustable mounting means to connect both flanges together.

3. The optical emission spectrometer according to claim 1, wherein at least an optical system base plate and optical components within the light path between entrance slit and detector are made of the same material.

4. The optical emission spectrometer according to claim 1, wherein at least the optical system flange is made of a metal.

5. The optical emission spectrometer according to claim 1, wherein the plasma stand flange is made of an electrically insulating material.

6. The optical emission spectrometer according to claim 5, wherein the electrically insulating material is a sandwich material, or thermally stable plastics or a ceramic material.

7. The optical emission spectrometer according to claim 1, wherein the connection between plasma stand flange and optical system flange is executed as a rigid toothed connection to prevent de-alignment between both flanges.

8. The optical emission spectrometer according to claim 1, wherein the plasma stand comprises an optical mask fixedly connected to the optical system or to the plasma stand and suitably arranged within the light path between plasma stand and optical system to mask at least a hot part of the plasma.

9. The optical emission spectrometer according to claim 1, wherein the plasma stand is a spark stand to establish a discharge between two electrodes to generate the arc/spark plasma of the sample material, where one of the electrodes is made of the sample material being evaporated in the arc/spark, where the axis of the arc/spark, is arranged perpendicular to the entrance aperture.

10. The optical emission spectrometer according to claim 1, wherein the plasma stand is a spark stand to establish a discharge between two electrodes to generate the arc/spark plasma of the sample material, where one of the electrodes is made of the sample material being evaporated in the arc/spark, where the axis of the arc/spark, is arranged in parallel to the entrance aperture.

11. The optical emission spectrometer according to claim 1, wherein the plasma stand is a Laser-induced breakdown spectroscopy stand, where a laser is focused on the sample material as a target material to generate the plasma.

12. The optical emission spectrometer according to claim 1, wherein the optical emission spectrometer is a mobile device.

13. A method to set up and operate an optical emission spectrometer as claimed in one of the preceding claims comprising a plasma stand directly and fixedly mounted on a plasma stand flange and an optical system directly and fixedly mounted on an optical system flange comprising several optical components, comprising the steps of
   directly and fixedly connecting the plasma stand flange and the optical system flange to each other;
   establishing a light emitting plasma from sample material;
   generating a spectrum of the light emitted by the plasma being characteristic to the sample material using an optical system comprising at least one entrance aperture and at least one diffraction grating;
   measuring the spectrum by one or more detectors;
   analyzing the measured spectrum and compensating it for a drift of the spectrum relative to the detector potentially caused by heat transferred from the plasma stand to the optical system considering the thermal expansion of the optical system by an analyzing unit.

14. The method as claimed in claim 13, further comprising masking at least a hot part of the plasma by an optical mask suitable arranged within the light path between plasma stand and optical system and fixedly connected to the optical system or to the plasma stand, depending on the orientation of the entrance aperture relative to the axis of the spark/arc.

* * * * *